(12) United States Patent
Kamida (10) Patent No.: US 8,665,379 B2
(45) Date of Patent: Mar. 4, 2014

(54) ELECTRONIC APPARATUS AND DISPLAY CONTROL METHOD

(75) Inventor: Masahiro Kamida, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 13/244,139

(22) Filed: Sep. 23, 2011

(65) Prior Publication Data

US 2012/0099021 A1 Apr. 26, 2012

Related U.S. Application Data (63) Continuation of application No. 12/970,752, filed on Dec. 16, 2010, now Pat. No. 8,072,543, which is a continuation of application No. 12/363,612, filed on Jan. 30, 2009, now abandoned.

(30) Foreign Application Priority Data

Feb. 29, 2008 (JP) ................................. 2008-050878

(51) Int. Cl.
*H04N 7/08* (2006.01)
(52) U.S. Cl.
USPC ........................................................ 348/706
(58) Field of Classification Search
USPC ............ 348/705, 706, 552, 553, 725; 725/74, 725/80, 59, 141
See application file for complete search history.

(56) References Cited

U.S. PATENT DOCUMENTS

| 5,760,698 | A | 6/1998 | Iijima et al. |
| 6,040,874 | A | 3/2000 | Kim |
| 6,150,953 | A | 11/2000 | Tanaka et al. |
| 6,490,009 | B1 | 12/2002 | Asakura |
| 7,372,506 | B2 | 5/2008 | Cho |
| 7,561,215 | B2 * | 7/2009 | Kim et al. ...................... 348/734 |
| 7,827,319 | B2 * | 11/2010 | Kimura et al. .................... 710/5 |

(Continued)

FOREIGN PATENT DOCUMENTS

| JP | 2002185874 | 6/2002 |
| JP | 2007-074715 | 3/2007 |

(Continued)

OTHER PUBLICATIONS

Japanese Patent Application No. 2010-037064, Notice of Reasons for Rejection, mailed Apr. 17, 2012, (with English Translation).

(Continued)

*Primary Examiner* — Paulos M Natnael
(74) *Attorney, Agent, or Firm* — Blakely, Sokoloff, Taylor & Zafman LLP (57) ABSTRACT

An electronic apparatus includes terminals, each being based on a specific standard and being used for communicating with an external device. The electronic apparatus includes a transmission module, an acquisition module and a display control module. The transmission module simultaneously transmits a power-on signal to external devices connected to the terminals, upon turn on of the electronic apparatus. The acquisition module acquires a physical address from one or more first external devices of the plurality of external devices by switching video input among one or more first terminals of the terminals. The one or more first external devices are turned on and the one or more first terminals being connected to the one or more first external devices. The display control module displays device information of the one or more first external devices and terminal numbers of the one or more first terminals. Other embodiments are also disclosed.

4 Claims, 5 Drawing Sheets

(56) References Cited

U.S. PATENT DOCUMENTS

| | | | |
|---|---|---|---|
| 8,072,543 B2 * | 12/2011 | Kamida | 348/552 |
| 2003/0229900 A1 | 12/2003 | Reisman | |
| 2006/0143679 A1 | 6/2006 | Yamada et al. | |
| 2006/0256241 A1 * | 11/2006 | Suzuki et al. | 348/706 |
| 2007/0073824 A1 | 3/2007 | Choo et al. | |
| 2007/0124823 A1 | 5/2007 | Tobita | |
| 2008/0168504 A1 * | 7/2008 | Yamada et al. | 725/58 |
| 2009/0091658 A1 | 4/2009 | Hirose | |
| 2009/0157885 A1 | 6/2009 | Takatsuji et al. | |
| 2011/0085087 A1 | 4/2011 | Kamida | |

FOREIGN PATENT DOCUMENTS

| | | |
|---|---|---|
| JP | 2007-180697 | 7/2007 |
| JP | 2008-022055 | 1/2008 |
| JP | 2008-035192 | 2/2008 |
| WO | WO 2005-006740 | 1/2005 |
| WO | WO 2007-074611 | 7/2007 |
| WO | WO 2007-123001 | 11/2007 |

OTHER PUBLICATIONS

Japanese Office Action dated Dec. 8, 2009 for application No. 2008-050878 (U.S. Appl. No. 12/363,612) (English Translation).

U.S. Appl. No. 12/363,612, Non Final Office Action, mailed May 26, 2010.

U.S. Appl. No. 12/363,612, Final Office Action, mailed Sep. 16, 2010.

U.S. Appl. No. 12/970,752, Non Final Office Action, mailed Mar. 17, 2011.

U.S. Appl. No. 12/970,752, Notice of Allowance, mailed Aug. 10, 2011.

U.S. Appl. No. 13/849,390, Non Final Action, mailed Nov. 6, 2013.

* cited by examiner

| Logical address (180) | Device number (181) | Device type (182) |
|---|---|---|
| 0 | TV | TV |
| 1 | Recording Device 1 | Recording Device |
| 2 | Recording Device 2 | Recording Device |
| 3 | Tuner 1 | Tuner |
| 4 | Playback Device 1 | Playback Device |
| 5 | (Unregistered) | (None) |
| 6 | Tuner 2 | Tuner |
| 7 | Tuner 3 | Tuner |
| 8 | Playback Device 2 | Playback Device |
| 9 | Recording Device 3 | Recording Device |
| 10 | Tuner 4 | Tuner |
| 11 | Playback Device 3 | Playback Device |
| 12 | (Reserved) | (Reserved) |
| 13 | (Reserved) | (Reserved) |
| 14 | (Free Use) | (Free Use) |
| 15 | (Unregistered) | (None) |

18A Logical address allocation table

F I G. 5

"T sb  18B Address list (18C Previous address list)

| Logical address (180) | Physical address (183) | Device type (182) | Device name (184) |
|---|---|---|---|
| 0 | 0.0.0.0 | TV | "ABC TV" |
| 1 | 1.0.0.0 | Recording Device | "ABC HDD" |
| 2 | (None) | (None) | (None) |
| 3 | 2.0.0.0 | Tuner | "Satellite ABC" |
| 4 | 3.0.0.0 | Playback Device | "DVD Player" |
| 5 | (None) | (None) | (None) |
| 6 | (None) | (None) | (None) |
| 7 | (None) | (None) | (None) |
| 8 | (None) | (None) | (None) |
| 9 | (None) | (None) | (None) |
| 10 | (None) | (None) | (None) |
| 11 | (None) | (None) | (None) |
| 12 | (None) | (None) | (None) |
| 13 | (None) | (None) | (None) |
| 14 | (None) | (None) | (None) |

F I G. 6

F I G. 7

ELECTRONIC APPARATUS AND DISPLAY CONTROL METHOD

CROSS-REFERENCE TO RELATED APPLICATIONS

This application is a continuation of U.S. patent application Ser. No. 12/970,752 filed on Dec. 16, 2010 which claims the benefit of priority on U.S. patent application Ser. No. 12/363,612 filed Jan. 30, 2009, which is based upon and claims the benefit of priority from Japanese Patent Application No. 2008-050878, filed Feb. 29, 2008, the entire contents of which are incorporated herein by reference.

BACKGROUND

1. Field

One embodiment of the present invention relates to a display control technique, and particularly to an electronic apparatus and display control method, which easily allows change of configuration when a device connected to the electronic apparatus is changed.

2. Description of the Related Art

According to the generally-known art, in the case where a television or the like is connected to an external apparatus via an HMDI (High Definition Multimedia Interface) cable, the external apparatus is controlled by means of an HDMI-CEC (Consumer Electronics Control) signal from the television. For example, Jpn. Pat. Appln. KOKAI Publication No. 2008-22055 discloses a technique of checking the ON or OFF status of the power supply of an external apparatus connected to a television or the like via an HMDI cable and acquires control information including a logical address of the apparatus based on a status response command.

However, according to the technique disclosed in Jpn. Pat. Appln. KOKAI Publication No. 2008-22055, if the external apparatus connected to the television or the like via the HMDI cable is exchanged to another one and the connecting configuration is changed, it is necessary to manually switch the respective inputs of the exchanged external apparatuses and update the connecting configuration.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus includes: a communication module which conducts communications with a plurality of external apparatuses; a storage module which stores an address list correlating a logical address and a physical address of each of the external apparatuses; a determination module which transmits a power-on signal to the external apparatus and thereafter determines a power state of the external apparatus; and an acquisition module which performs switching of input by the communication module after the determination module determines that the external apparatus has been powered on, and acquires apparatus information including the physical address of the external apparatus.

An embodiment of the present invention will be described below with reference to the accompanying drawings.

First, a configuration of an electronic apparatus according to the embodiment of the present invention will be described with reference to FIGS. 1 and 2. The electronic apparatus is implemented as, for example, a television 1.

Figure 1:
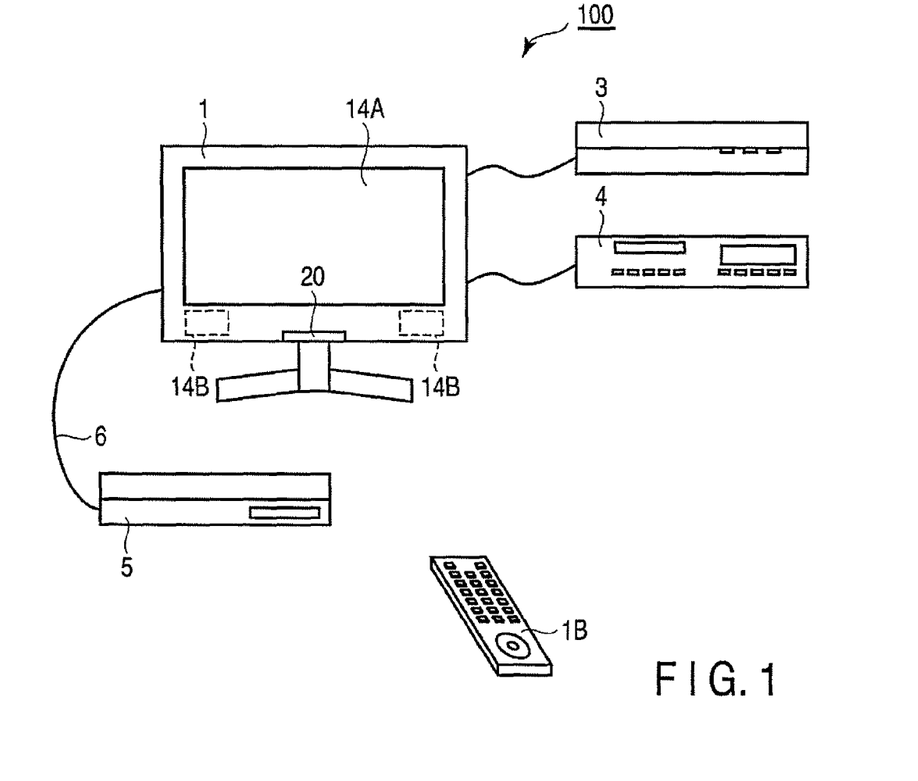
FIG. 1 is an exemplary schematic block diagram, which shows an example of a configuration of electronic apparatuses according to an embodiment of the present invention.

FIG. 1 is a schematic block diagram, which shows an example of a configuration of an HDMI (High-Definition Multimedia Interface) system including the television 1 as the electronic apparatus according to the embodiment of the present invention. The HDMI system 100 includes: the television 1, which is an electronic apparatus that receives broadcast waves, such as terrestrial digital broadcast waves, demodulates them and displays images, or receives and displays video signals from an external input; a set top box 3 as a tuner which receives and demodulates satellite broadcast waves such as BS (Broadcast Satellite) broadcast waves and CS (Communication Satellite) broadcast waves; a DVD player 4 which plays a medium such as a DVD (Digital Versatile Disc); and an HDD (Hard Disc Drive) recorder 5 configured to record a video signal from broadcast and an external input and output the recorded contents to an external device. These devices are connected via an HDMI cable 6 as shown in FIG. 1. A remote controller 1B is a dedicated remote controller to operate the television 1. However, it is configured to transmit a command signal also to another electronic apparatus via the HDMI cable 6 and operate the same.

The television 1 checks the connection to the electronic apparatuses connected through the HDMI cable 6 when the television 1 is powered on, and also periodically checks the connection during normal operations. The information on the connection check is transmitted and received through a CEC (Consumer Electronics Control) control line of the HDMI cable 6.

Figure 2:
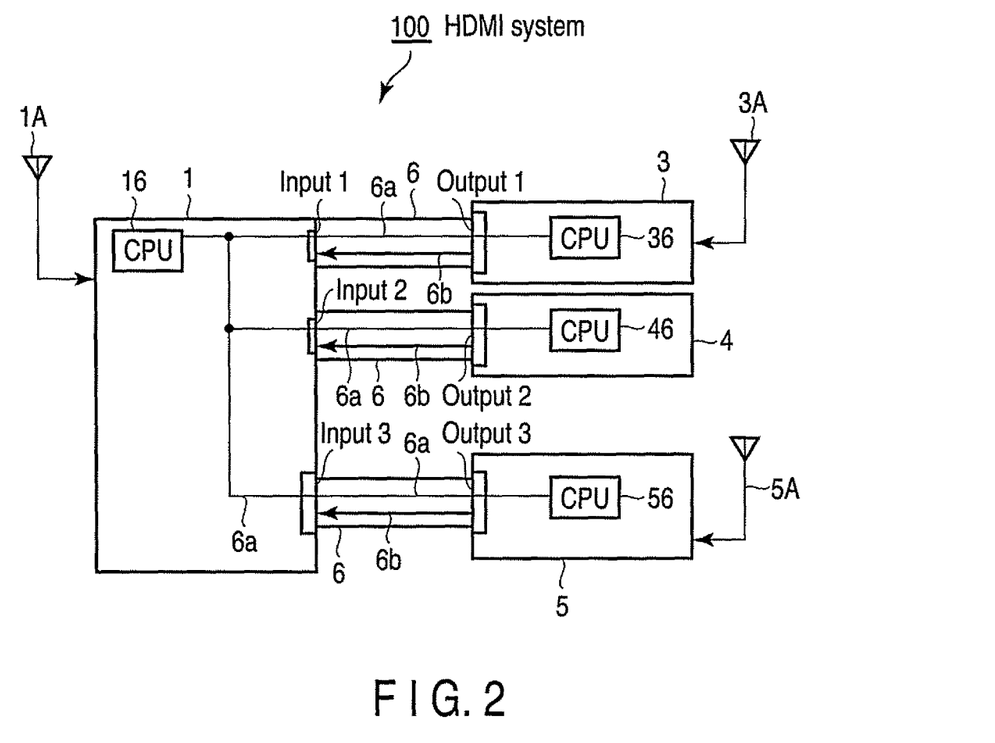
FIG. 2 is an exemplary block diagram showing a connecting configuration of the electronic apparatuses of the embodiment.

FIG. 2 is a block diagram showing a configuration of the HDMI system according to the embodiment of the present invention.

As shown in FIG. 2, the television 1 has inputs 1 to 3 of HDMI terminals. The inputs 1 and 2 of the television 1 are respectively connected to outputs of the set top box 3 and the DVD player 4 through the HDMI cable 6. The input 3 of the television 1 is connected to an output of the HDD recorder 5 via the HDMI cable 6. Further, the television 1 receives, for example, terrestrial digital broadcast waves via an antenna 1A.

The set top box 3 receives, for example, BS and CS broadcast waves via an antenna 3A. The HDD recorder 5 receives, for example, terrestrial digital broadcast waves via an antenna 5A.

The HDMI cable 6 has a CEC (Consumer Electronics Control) control line 6a and an HDMI line 6b. The CEC control line 6a serially connects CPUs 36, 46 and 56 of the respective electronic apparatuses. The HDMI line 6b connects the electronic apparatuses to transmit video signals and audio signals.

Figure 3:
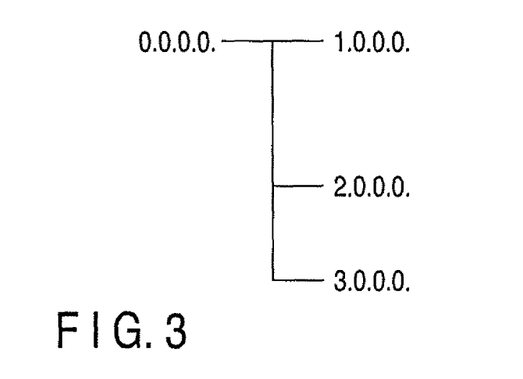
FIG. 3 is an exemplary schematic diagram showing physical addresses set in the respective electronic apparatuses.

FIG. 3 shows an example of physical address notations representing physical addresses set in the respective electronic apparatuses in the case where the electronic apparatuses are connected as shown in FIG. 2. For example, the television 1 is represented as "0.0.0.0", the HDD recorder 5 is represented as "1.0.0.0", the set top box 3 is represented as "2.0.0.0" and the DVD player 4 is represented as "3.0.0.0".

Figure 4:
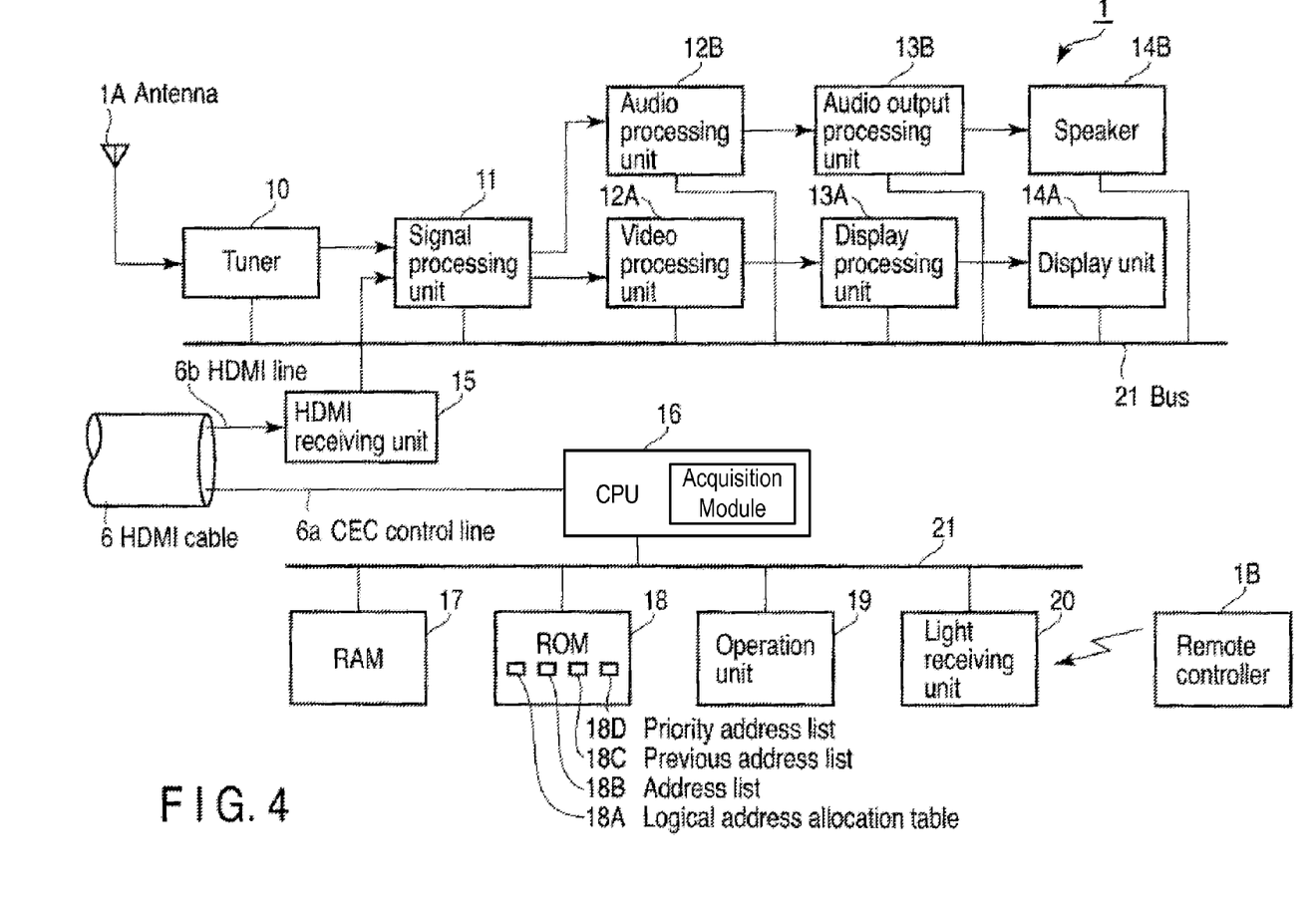
FIG. 4 is an exemplary block diagram showing a configuration of the electronic apparatus of the embodiment.

FIG. 4 is a block diagram showing a configuration of the television 1 of the embodiment.

The television 1 includes a tuner 10 which receives terrestrial digital television broadcast waves via the antenna 1A and selects a channel; a signal processing module 11 which separates outputs from the tuner 10 in accordance with the type of data into video data, audio data and subtitle data and processes them; a video processing module 12A which decodes the video data and subtitle data from the signal processing module 11; a display processing module 13A which converts an output from the video processing module 12A to a video signal for display; a display module 14A which displays the output from the display processing module 13A on an LCD (Liquid Crystal Display); an audio processing module 12B which decodes audio data from the signal processing module 11; an audio output processing module 13B which converts an output from the audio processing module 12B to an audio signal and outputs the audio signal; a speaker 14B which converts an output from the audio output processing module 13B to a sound; an HDMI receiving module 15 which receives video data and audio data from an external apparatus through the HDMI line 6b of the HDMI cable 6; a CPU (Central Processing Module) 16 which receives CEC control data from the external apparatus through the CEC control line 6a of the HDMI cable 6 and controls the parts of the television 1; a RAM (Random Access Memory) 17 which temporarily stores data processed by the CPU 16; a ROM (Read Only Memory) 18 storing a logical address allocation table 18A, an address list 18B, a previous address list 18C and a priority address list 18D; an operation module 19 which comprises a plurality of switches and operates the television 1 based on inputs to the switches; and a light receiving module 20 which receives a command transmitted from the remote controller 1B with an infrared signal. These parts are connected one another via a bus 21.

The HDMI cable 6 is connected to an HDMI connector (not shown) and connected to the HDMI receiving module 15 and the CPU 16 via an interface of the HDMI.

Figure 5:
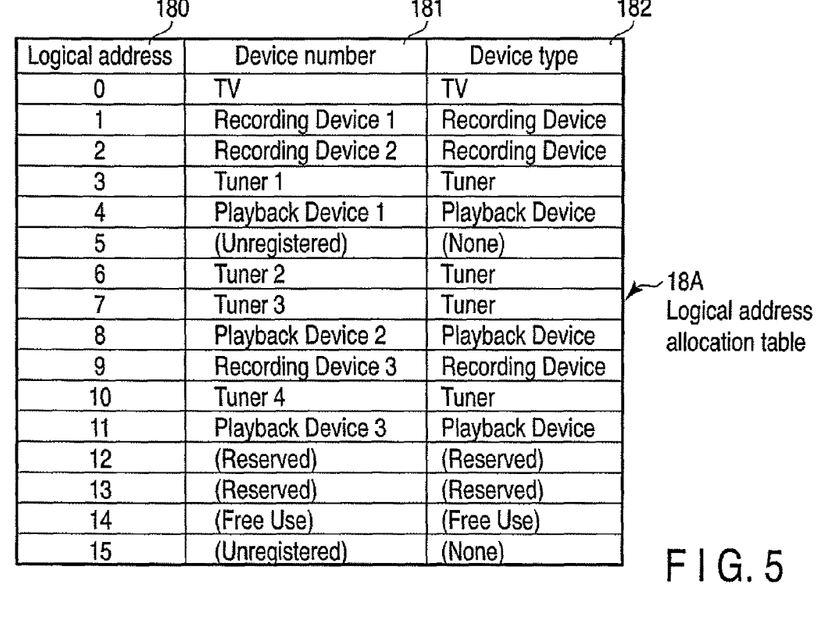
FIG. 5 is an exemplary diagram showing a logical address allocation table and an address list according to the embodiment.
Figure 6:
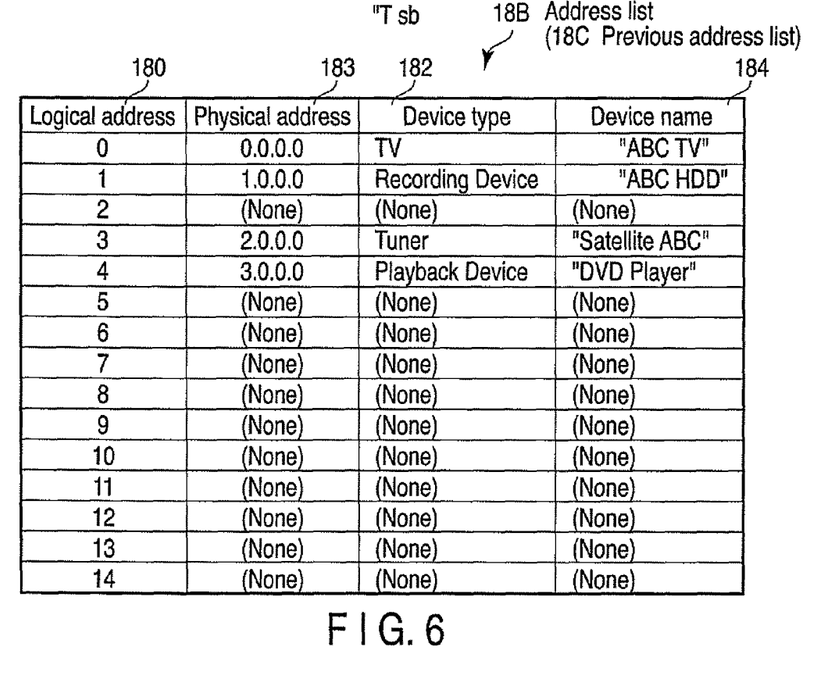
FIG. 6 is an exemplary diagram showing a logical address allocation table and an address list according to the embodiment.

FIGS. 5 and 6 are diagrams each showing a configuration of a logical address allocation table and an address list according to the embodiment of the present invention.

As shown in FIG. 5, the logical address allocation table 18A correlates a logical address 180 on the specification of the HDMI-CEC with a device number 181 and a device type 182. There are sixteen numbers "0" to "15" for the logical address 180.

The numbers "0" to "11" of the logical address 180 are correlated to the items of the device number 181 and the device type 182 as indicated in the logical address allocation table 18A. The numbers "12" and "13" of the logical address 180 have not been correlated to either the device number 181 or the device type 182 at the time of May 2007, and therefore cannot be used.

The number "14" of the logical address 180 is "Free Use", and therefore can be correlated to any items in the device number 181 and the device type 182. For example, in the case where the recording devices 1 to 3 are used and one more recording device is needed, the logical address number "14" can be used for that purpose. The number "15" of the logical address 180 cannot be used solely by an apparatus. However, when a command is executed, the command is transmitted to all the apparatuses except for the apparatuses using the other logical addresses.

As shown in FIG. 6, when the television 1 confirms the connection of an external apparatus connected thereto via the HDMI cable 6, the address list 18B is produced by writing the physical address 183 and the device name 184 of the external apparatus. FIG. 6 shows the case in which the television 1 has confirmed the connection of the set top box 3, the DVD player 4 and the HDD recorder 5 in the HDMI system 100 shown in FIG. 2.

Figure 7:
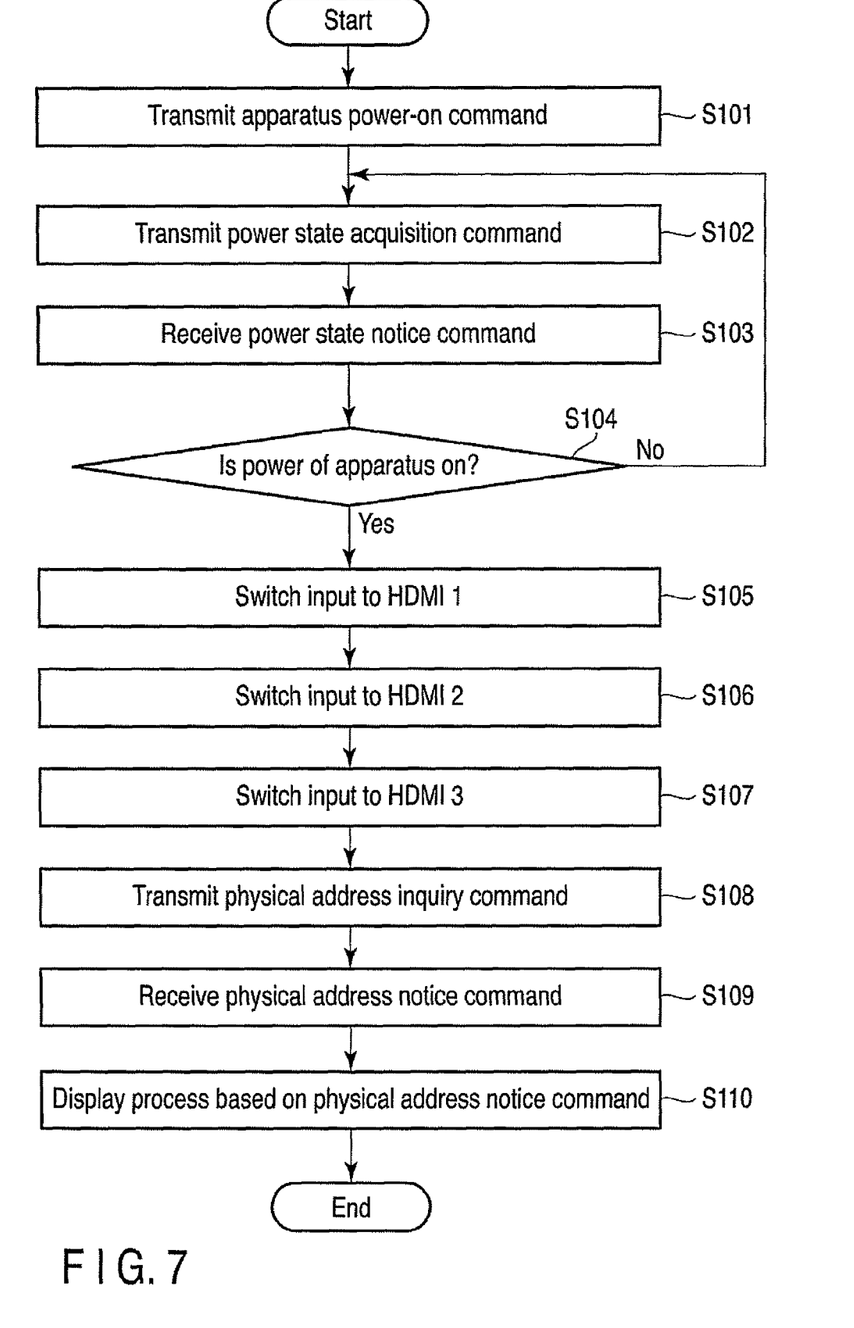
FIG. 7 is an exemplary flowchart for explaining a display control method for the electronic apparatus according to the embodiment.

A control method applied to the electronic apparatus of the embodiment will be described with reference to FIG. 7.

First, when the user powers on the television 1 by operating the operation module 19 or the remote controller 1B, the CPU 16 performs a startup process for the television 1. The startup process includes initializing the parts, reading the set data, etc. The CPU 16 performs a connection check of the external apparatus connected through the HDMI cable 6 as well as the startup process. The connection check is performed on the basis of the logical address allocation table 18A by writing the physical addresses 183 and the device names 184 corresponding to the logical addresses 180 for the respective connected external apparatuses.

To check the connection of the respective logical addresses, the CPU 16 transmits an apparatus power-on command to the connected external apparatuses using the command <Give Physical Address> based on the HDMI standard 12 (block S101). For example, the following command is used as the apparatus power-on command. The apparatus power-on command is preferably transmitted simultaneously to all external apparatuses connected through the HDMI cable 6 to reduce the process time.

Apparatus Power-on Command: <User Control Pressed> [Power]

Command [0x44], Parameter [0x40]

Next, the television 1 transmits a power state acquisition command to the external apparatuses to which the power-on command has been transmitted (block S102: an acquiring module). The power state acquisition command is a command to check whether the external apparatus, to which the apparatus power-on command was transmitted, has been powered on or not. For example, the following command is used as the power state acquisition command.

Power State Acquisition Command: <Give Device Power Status>

Command [0x90], Parameter [None]

Then, the television 1 receives a power state notice command from the external apparatus to which the power state acquisition command was transmitted (block S103). For example, the following command is used as the power state notice command.

Power State Notice Command: <Report Power Status> Command [0x8F], Parameter

The parameter indicative of the received power state is as follows, for example: 0x00="ON", 0x01="Standby", 0x02="In transition Standby to On", 0x03="In transition On to Standby".

Thereafter, the television 1 determines whether each external apparatus is powered on or not based on the received power state notice command of the external apparatus (block S104). If the television 1 determines that the external apparatus is powered on (YES in block S104), for example, if it determines that the set top box 3, the DVD player 4 and the HDD recorder 5 connected to HDMI1 to HDMI 3 are powered on, the HDMI input of the television 1 is sequentially switched in the ascending order of the logical addresses, that is, from HDMI 1 to HDMI3 (block S105 to block S107). In this case, when the input is switched to each of the input terminals (HDMI1 to HDMI3), the system stands by in the input state for a predetermined period of time, for example, 2 to 3 seconds (the input state is maintained), so that video data can be output from the external apparatus to the television 1. In other words, some of the external apparatuses are brought to a state enabling a video output and thereby updated to correct physical addresses. Accordingly, in the process of switching the input from the television 1 to the external apparatuses connected through the HDMI cable 6, first, the external apparatuses are powered on and then the CPU 16 of the television 1 switches the input of the HDMI so that the input from all external apparatuses connected to the HDMI cable can be displayed as images. As a result, the system is brought to a state in which the external apparatuses can transmit various commands to the television 1. The simultaneous power-on as described above reduces the process time as compared to the case in which the apparatuses are separately powered on one by one. Further, since the power-on of the external apparatuses is checked one by one, the system is brought to a state in which the external apparatuses can reliably output image data to the television 1.

When switching of all inputs is completed, the television 1 transmits to the switched external apparatuses a physical address inquiry command to acquire apparatus information including a physical address of each of the external apparatuses from the external apparatuses (block S108). Then, the television 1 receives a physical address notice command from the external apparatuses to which the physical address inquiry command was transmitted (block S109). The physical address notice command received from the external apparatus includes apparatus information indicative of the type of the apparatus (device type) in addition to the physical address (e.g., 1.0.0.0).

Figure 8:
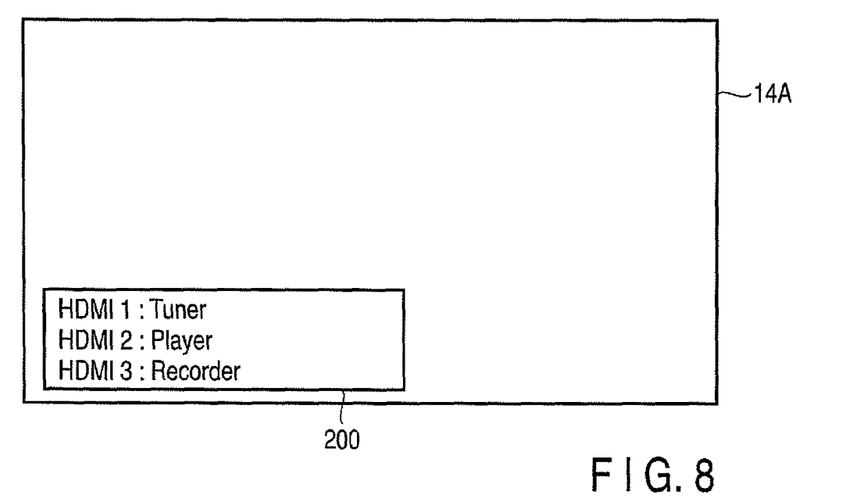
FIG. 8 is an exemplary schematic diagram showing an example of the display of the electronic apparatus according to the embodiment.

The television 1 updates the physical address and the like in accordance with the received physical address notice command. As shown in FIG. 8, the physical address and apparatus information are displayed in the display module 14A of the television 1, for example, as a menu 200 (block S110). The menu 200 indicates the terminal number of the HDMI terminal corresponding to the physical address and the type of the apparatus (e.g., the tuner) associated with the terminal number. If necessary, the menu 200 may also indicate the device name 184 or the like (see FIG. 6).

If the television 1 determines that the external apparatus is not powered on in block S104 (NO in block S104), the power state acquisition command is transmitted again after a predetermined period of time to the external apparatus which has been determined to be not powered on (block S102). Alternatively, the specification may be such that if the television 1 determines that the external apparatus is not powered on in block S104 (NO in block S104), the apparatus power-on command and the power state acquisition command may be transmitted again after a predetermined period of time to the external apparatus which has been determined to be not powered on.

The timing of updating the physical address varies depending on the apparatuses. However, the physical addresses of all apparatuses can be updated by switching the input of the HDMI.

After the above process is executed, the external apparatuses connected to the television 1 are kept powered on. Therefore, a command to power off is transmitted to the external apparatuses that have been powered on. As a result, the power of each external apparatus is changed to the state of that before the process of the above embodiment is executed. To execute the power-off process, it is necessary to check in advance the power state of each of the external apparatuses. Therefore, the television transmits the power state acquisition command to each external apparatus and received the power state notice command therefrom.

A module can be accomplished in software and hardware.

As described above, according to this embodiment, even when the configuration of the connection is changed, the configuration of the connection can automatically be updated. In other words, the user can connect the apparatuses without taking the configuration into consideration in particular and the configuration of the connection can automatically be updated.

An object of the present invention is to provide an electronic apparatus and display control method, which can automatically update the connecting configuration, even when the connecting configuration has been changed.

The present invention is not limited to the above embodiment only, but the elements thereof can be modified without departing from the spirit or scope of the invention when practiced.

Further, some of the plurality of elements of the above embodiment described above may be suitably combined, so that various inventions may be achieved. For example, some of the elements may be deleted from all elements of the embodiment. Furthermore, elements of different embodiments may be suitably combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising a plurality of terminals, each of the plurality of terminals being based on a specific standard and being used for communicating with an external device, comprising:
    a transmission module configured to simultaneously transmit a power-on signal to a plurality of external devices connected to the plurality of terminals, upon turn on of the electronic apparatus;
    an acquisition module configured to acquire a physical address from one or more first external devices of the plurality of external devices by switching video input among one or more first terminals of the plurality of terminals, the one or more first external devices being turned on, the one or more first terminals being connected to the one or more first external devices; and a display control module configured to display device information of the one or more first external devices and terminal numbers of the one or more first terminals, wherein the device information corresponding to one of the one or more first external devices comprises at least one of a device type or a device name of the one of the one or more first external devices, wherein the acquisition module is configured to transmit power state acquisition commands to the plurality of external devices after the transmission module transmits the power-on signal, and to determine power states of the plurality of external devices one by one, based on responses from the plurality of external devices.

2. The electronic apparatus of claim 1, further comprising:

a determining module configured to determine power states of the plurality of external devices before the transmission of the power-on signal; and a power-off module configured to transmit a power-off command to a second external device of the plurality of external devices, the second external device being a device turned on by the power-on signal.

3. A display control method for use in an electronic apparatus, the apparatus comprising a plurality of terminals, each of the plurality of terminals being based on a specific standard and being used for communicating with an external device, the method comprising:

simultaneously transmitting a power-on signal to a plurality of external devices connected to the plurality of terminals, upon turn on of the electronic apparatus;

acquiring a physical address from one or more first external devices of the plurality of external devices by switching video input among one or more first terminals of the plurality of terminals, the one or more first external devices being turned on, the one or more first terminals being connected to the one or more first external devices; and displaying device information of the one or more first external devices and terminal numbers of the one or more first terminals, wherein the device information corresponding to one of the one or more first external devices comprises at least one of a device type or a device name of the one of the one or more first external devices, wherein the acquiring comprises transmitting power state acquisition commands to the plurality of external devices after the transmission of the power-on signal, and determining power states of the plurality of external devices one by one, based on responses from the plurality of external devices.

4. The display control method of claim 3, further comprising:

determining power states of the plurality of external devices before the transmission of the power-on signal; and transmitting a power-off command to a second external device of the plurality of external devices, the second external device being a device turned on by the power-on signal.

\* \* \* \* \*